United States Patent

[11] 3,571,578

[72] Inventor Laurel D. Fry
Endwell, N.Y.
[21] Appl. No. 814,502
[22] Filed Mar. 20, 1969
[45] Patented Mar. 23, 1971
[73] Assignee General Electric Company
Continuation of application Ser. No.
370,227, May 26, 1964, now abandoned.

[54] DIGITAL ADAPTIVE CONTROL SYSTEM SENSOR
7 Claims, 11 Drawing Figs.
[52] U.S. Cl. .................................................. 235/150.1,
235/150.2, 318/561, 244/77
[51] Int. Cl. .............................................. G05b 13/02
[50] Field of Search .......................................... 235/150.1,
150.2; 318/561; 244/77

[56] References Cited
UNITED STATES PATENTS
3,216,676 11/1965 Brown et al.................... 235/150.1X
3,287,615 11/1966 Smyth ........................... 235/150.1X
3,412,299 11/1968 Buscher et al. ............... 318/561
3,446,946 5/1969 Andeen ......................... 235/150.1

Primary Examiner—Malcolm A. Morrison
Assistant Examiner—Charles E. Atkinson
Attorneys—Francis K. Richwine, Irving M. Freedman, Joseph B. Forman, Frank L. Neuhauser and Oscar B. Waddell ABSTRACT: A damping sensor that counts the number of signal half cycles of an adaptive mode signal between the occurrence of a transient signal exceeding a selected threshold level and the time at which system damping reduces the adaptive signal amplitude below the threshold level, times the signal half cycles, and generates gain changing signals in accordance with the count. The sensor counts signal threshold crossings during each of repetitive adaptive sensing program cycles. The program cycles are initiated by a transient signal exceeding a threshold established by a deadband circuit and terminated by a timer after a fixed time from the last signal half cycle exceeding the threshold or after the first zero crossing if the second zero crossing comes after the fixed time setting of the timer in those instances in which the adaptive mode signal frequency is too low.

(MIRROR IMAGE NOT SHOWN)

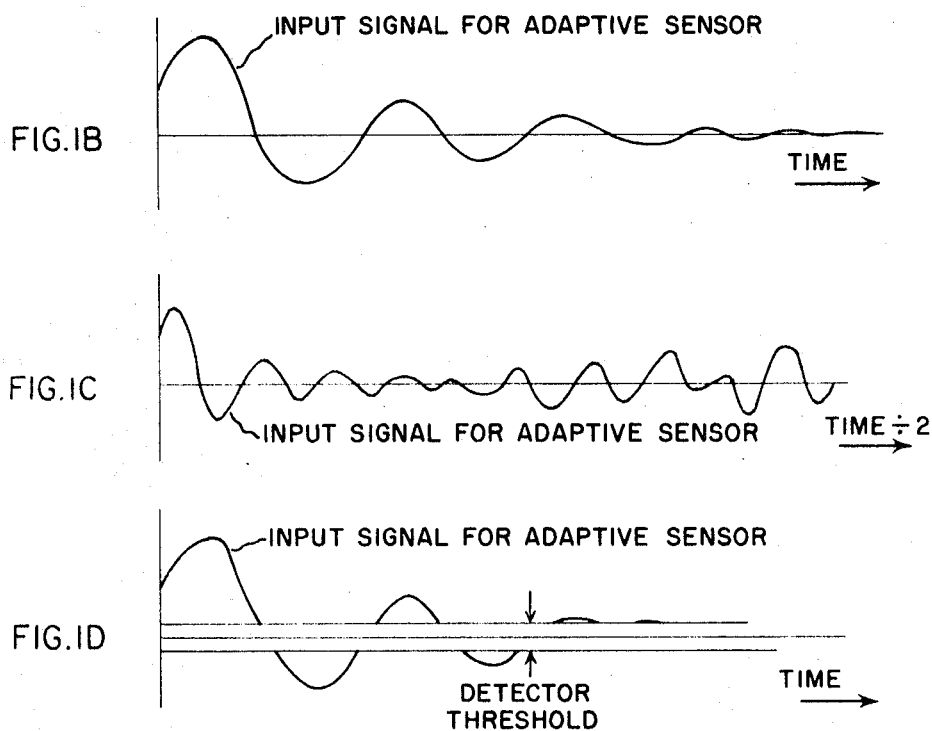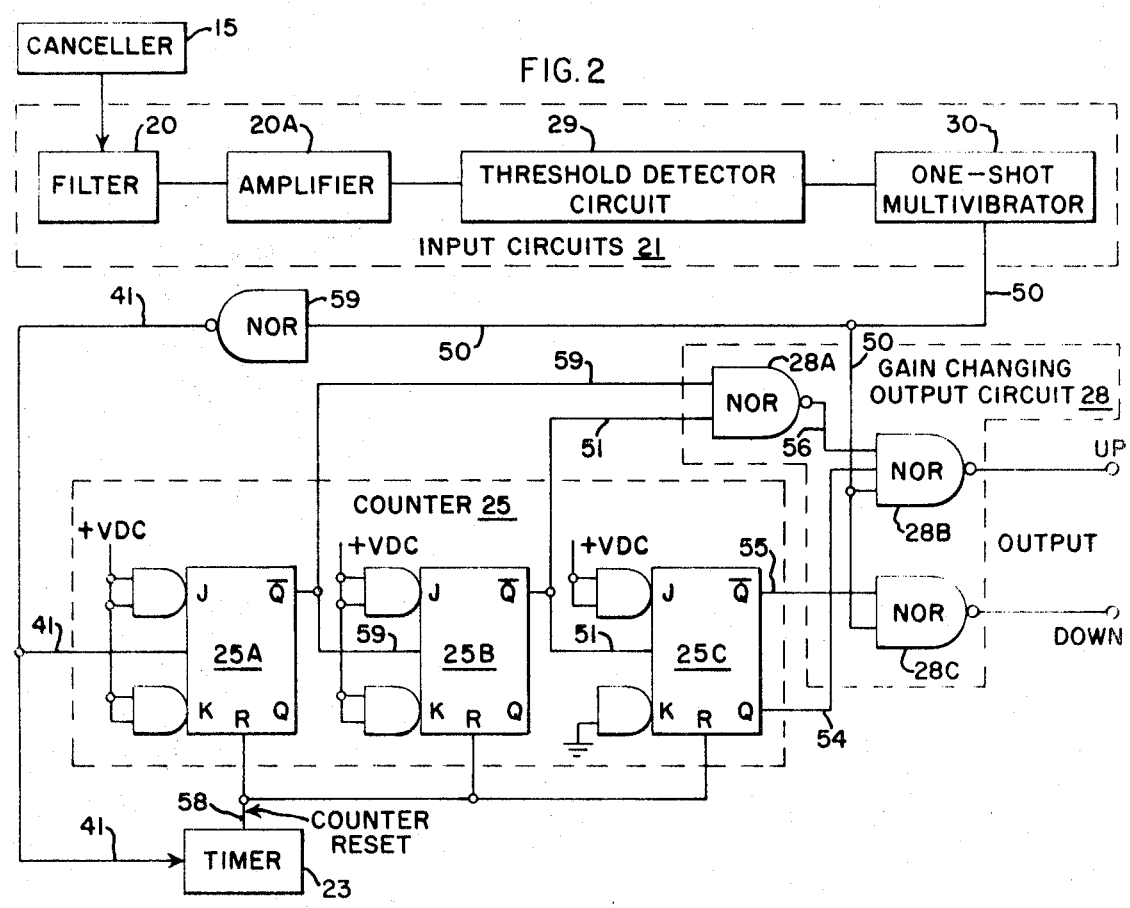

OUTPUT

DIGITAL ADAPTIVE CONTROL SYSTEM SENSOR

This invention relates to an improvement in self-adaptive control systems. It is useful in flight control systems where it is necessary to accurately vary the feedback gains in the feedback loops to compensate for changes in vehicle dynamics and changes in their environmental conditions.

A successful self-adaptive control system is illustrated by the prior art pitch channel of FIG. 1 which utilized an adaptive frequency sensor. In response to a pilot control stick movement, or other command signal source, an aircraft 11 is controlled in pitch rate $\dot{\theta}$, in accordance with an input rate command signal $\dot{\theta}_c$ and a degenerative feedback signal $\dot{\theta}_f$ derived by a rate gyro 12. Actuator 20 positions the aircraft control surface 11' so that the pitch rate $\dot{\theta}$ of aircraft 11 follows the input signal $\dot{\theta}_c$. The particularly signal processing configuration for stability augmentation incorporates integrator 13 which integrates the error signal derived from $\dot{\theta}_c - \dot{\theta}_f$ and also introduces the selected fixed gain factor. The integrated error signal $\dot{\theta}_c - \dot{\theta}_f$ is augmented by signals derived from the feedback signal $\dot{\theta}_f$ by means of parallel multiplier 14 and "canceller" 15. Integrator 13, multiplier 14, and canceller 15 together form an inverse feedback model which modifies the feedback signals in accordance with the nominal aircraft characteristics. This signal processing is adjusted to produce the desired airplane response characteristics in accordance with conventional servo design by selecting the appropriate nominal values for the constants. The system is made self-adaptive by means of the variable gain changer 19 which is adjusted by memory 18 in accordance with variations in the system natural frequency response due to changes in environment, aircraft parameters, etc. For further details of this system, reference is made to the Proceedings of the 1961 Western Electronic Show and Convention (WESCON) "Self Adaptive Control Through Frequency Regulation" by R.G. Buscher, K.B. Haefner, and M.F. Marx.

The adaptive sensor 17 monitors the damped natural frequency $\omega_d$ of the adaptive mode. This is done by measuring the time interval between the zero crossings of the time varying signal. The time measured is compared to a reference time interval. This reference time is the period associated with some desired damped natural frequency. If the measured time interval is less than the reference time, the actual frequency is higher than the desired frequency.

The operation, as seen in the root locus plot of FIG. 1A, is characterized by a possible system locus 1 having the point A' for the root (for a particular value of gain), which is above the line of constant damped natural frequency $\omega_d$. This indicates that the system gain is too high. The gain is then reduced to servo the frequency response back to the reference frequency $\omega_d$ at point A. If the root occurs at some point A'', the gain is too low. The gain changer 19 then increases the system gain. The choice of what frequency to use as the reference $\omega_d$ is based on the specific application. The nominal range for this frequency is 2 to 5 c.p.s.

With changes in flight conditions or system characteristics, the locus or mode could change to locus 2 where a root B would be moved to C. Other effects such as aging of the actuators, could cause locus 3 to result. The adaptive sensor 17 then operates to cause the mode to have the constant damped natural frequency $\omega_c$. However, in moving the root from D to E, an unstable condition is reached. Considering locus 3 again, another problem can be seen. The gradient of change in $\omega_d$ per change in gain at point D can be much less than in the neighborhood of point A on locus 1. This results in sluggish adaption whereby the loop may take too long to adapt. Thus, care must be taken in choosing the desired $\omega_d$, and variations in actuators, the setting of the reference and unexpected flight conditions can cause unsatisfactory operation is adequate margins are not established. While this can be done, it is at the sacrifice of the range of adaption and the imposition of constraints on the permissible range of system characteristics.

An improvement over the frequency sensor originally incorporated in the FIG. 1 adaptive control system is the damping sensor disclosed in U. S. Pat. No. 3,412,299, Nov. 19, 1968 "Adaptive Control System and Method", Richard G. Buscher and Glenn W. Walker, which provides accurate sensing of the damping characteristics of a control system.

FIG. 1B is a diagram of an idealized filtered feedback signal from which an adaptive sensor such as that shown in FIG. 1 or in the Buscher and Walker patent is designed to derive an adaptive gain changing signal. It represents a damped sinusoidal response to a theoretical impulse disturbance in which a relatively narrow band of frequencies is sensed. For a control system in a high performance aircraft, the adaptive mode signal frequency is typically in the band of 2—5 c.p.s. In operation, the actual disturbances are of varying initial amplitudes and unpredictable in occurrence as illustrated in FIG. 1C. Therefore, practical systems incorporate a deadband effect which cuts off signals below a selected threshold whereby the adaptive sensor does not respond to low level disturbances. As a result, the signal sensed is more realistically illustrated in FIG. 1D. From an analytic point of view, the use of a deadband distorts the signal and makes it more difficult to analyze system performance. Another difficulty is that the damping of the system is such that the fourth half cycle is typically 1 percent of the first half cycle in area, (including the deadband portion). Implementation is accordingly faced with a very large scale factor requirement for some components such as amplifiers and integrators.

The desired operation of a self adaptive control system of this class is described in the article Buscher, Haefner and Marx. Aspects of the desired performance include the need for maintaining the adaptive mode frequency within the desired frequency band and the need for maintaining the damping at the desired constant. A major constraint in these systems is that the frequency band of interest is relatively low, even though it is higher than the normal band within which the control mode appears. In high performance aircraft, the normal frequency band for the adaptive mode of two to five cycles per second requires efficient analysis of signals sensed by the damping sensor and prohibits substantial delay in effecting actual gain changer adjustment. The control system is a real-time data processor upon which very expensive equipment and personnel are critically dependent for efficient operation and safety.

Accordingly, an object of the invention is to provide an adaptive sensor which ensures rapid response to frequency variations in adaptive mode signals while blending efficient response to the changes in system damping characteristics.

Another object of the invention is to provide an adaptive sensor which is readily implemented with noncomplex conventional digital and analogue circuits while retaining statistically reliable analysis of system performance even with high damping.

A damping sensor is provided which counts the number of signal half cycles of the adaptive mode signal, between the occurrence of a transient signal exceeding a selected threshold level and the time at which system damping reduces the adaptive signal amplitude below the threshold level, timing the signal half cycles, and generating gain changing signals the count. The sensor counts signal threshold crossings during each of repetitive adaptive sensing program cycles. The program cycles are initiated by a transient signal exceeding a threshold established by a deadband circuit and terminated by a timer after a fixed time from the last signal half cycle exceeding the threshold or after the first threshold crossing if the second threshold crossing comes after the fixed time setting interval of the timer (that is, if the adaptive mode signal frequency is too low).

The invention, together with further objects and advantages thereof, may best be understood by referring to the following description taken in conjunction with the appended drawings in which like numerals indicate like parts in which:

FIG. 1 is a block diagram of a prior art self-adaptive flight control channel. FIG. 1A is a partial root locus plot illustrating operation, and FIG. 1B-C illustrate adaptive mode input signals. FIG. 1D illustrates the effect of the detector threshold applied to an adaptive mode signal.

Figure 1:
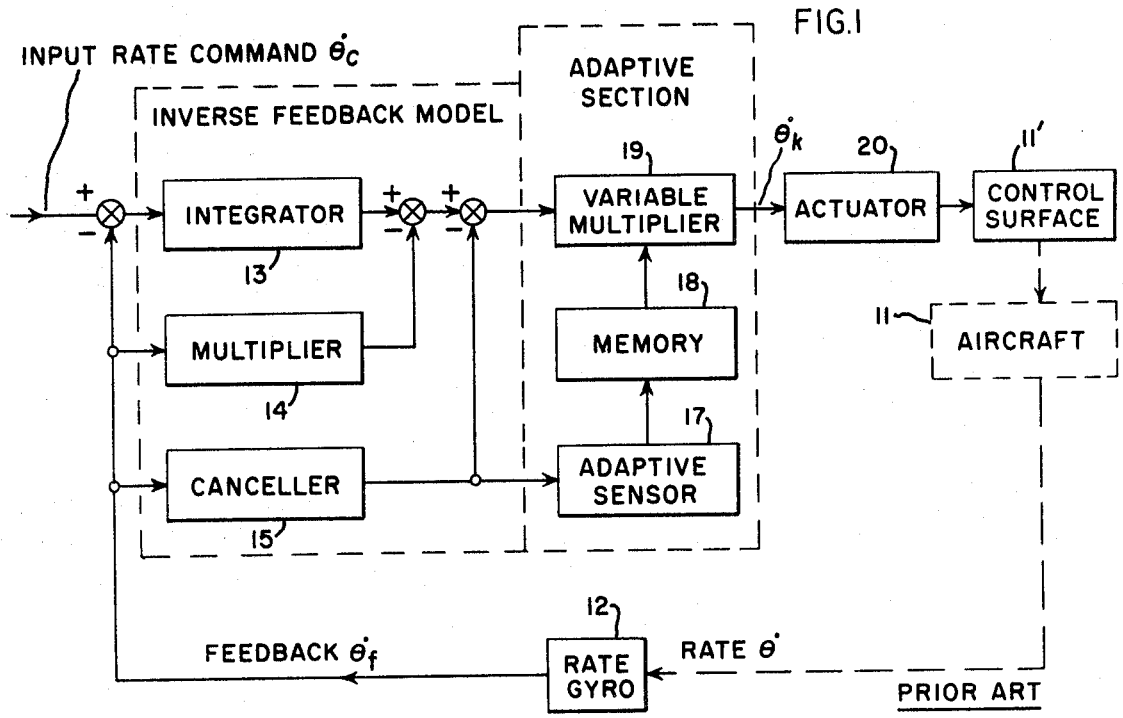
Figure 1A:
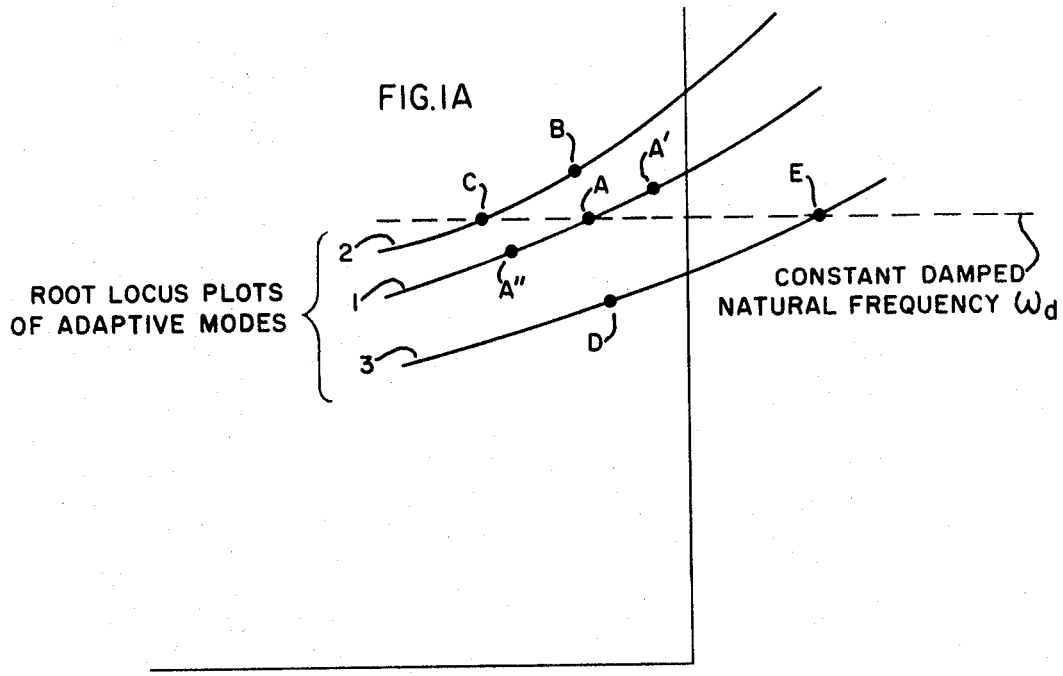
Figure 2A:
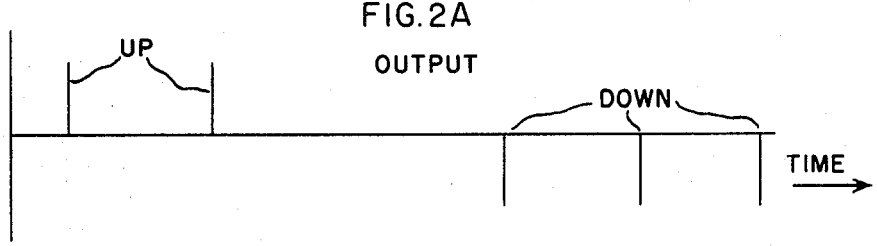
FIG. 2 is a block diagram of a preferred embodiment of the novel digital adaptive control system sensor intended to replace the adaptive sensor 17 in the prior art schematic of FIG. 1, and FIGS. 2A and 2B are a representative gain changing output waveform and a partial root locus plot, illustrating a typical operation.

The FIG. 2 embodiment of the novel damping sensor is for use in a flight control system such as the FIG. 1 pitch control channel. The sensor input is derived from the standard canceller 15 by means of input circuits 21 which includes a band pass filter 20 (that passes signal frequencies in the neighborhood of the desired constant damped natural frequency of the system channel, the band of adaptive mode frequencies), an amplifier 20A, a deadband threshold and detector circuit 29, and a single-shot multivibrator 30. The adaptive response signal is then in the form of threshold crossing signals that are sensed during repetitive program cycles to determine the damping and frequency changes of the system. This is performed by a special counter 25 in the form of a series of binary counter stages. The counter 25 drives a gain changing output circuit 28 for correction of the variable gain change function which is in the device shown in FIG. 1 performed by the variable multiplier 19 and memory 18 in a manner more fully described hereinafter. A gain changing signal increment is generated each time one of the thresholds is crossed by the filtered canceller signal in accordance with its count value in the program cycle. The count function is controlled by timer 23 which, in response to each threshold crossing signal from the input circuits 21, measures a fixed time period within which a second threshold crossing signal should occur and thereby establishes the duration of the program cycle. The timer 23 generates a reset pulse signal after this fixed time period which resets counter 25 and thereby terminates the program cycle, provided another threshold signal has not intervened during this fixed time period following the initial threshold crossing signal which started the time period. If another threshold crossing signal has intervened, the timer 23 is not allowed to complete its time cycle or "time out" but is immediately reset and restarted. This will allow counter 25 to continue to count the threshold crossings until the amplitude of the adaptive response signal is damped below the threshold level of the input circuits 21. The gain changing output circuit 28 is comprised of logic circuits coupled to counter 25 so that each count generates a gain changing pulse in the pattern illustrated in FIG. 2A. The first two threshold crossings produce UP gain pulses, the third threshold crossing produces no change, and all succeeding pulses produce DOWN pulses until there are no more threshold crossings within the fixed period of timer 23. With the DOWN pulses weighted double that of the UP pulses, in respect to the effect on gain change function performed by memory 18 and multiplier 19, reset of counter 25 after four threshold crossings results in a net gain change of zero.

The input circuits 21 in the preferred embodiment utilize the canceller 15 to perform part of the isolation of the adaptive mode signals from the total system feedback signal. In an aircraft, the feedback model is usually tailored to provide a nominal response profile which is considered the best compromise for a particular application. The adaptive sensor is intended to analyze the portion of the response characteristics attributable to system characteristics which are variable. The feedback signal is the product of a large number of contributing factors of which the portion containing information relating to the adaptive mode is only a small part. In fact, the total noise in the feedback signal can readily exceed the adaptive mode signal portion. It is therefore important in self adaptive systems of the class disclosed in the Buscher et al. article, cited above, that the adaptive mode signal be derived efficiently. Filter 20 provides an important contribution by rejecting feedback signal components at frequencies not of interest. Generally it is also important to cancel signal components not of interest which could have portions contributing to the frequencies analyzed. Canceller 15, for example, effectively cancels out feedback signal components resulting from manual controller input signals. The choices of filtering and cancelling circuits, and the choices of what existing system circuits (if any) can be used to perform dual signal processing functions are numerous. An adaptive sensor generally requires at least a filter and because the adaptive mode signal is of relatively small amplitude, a conventional linear amplifier 20A assists waveform analysis.

While the deadband threshold detector circuit 29 is also used generally with adaptive sensors, in the digital adaptive sensor it performs a dual function. In addition to operating as a noise rejector, it performs together with timer 23, the key function of establishing sensor program cycles. The digital adaptive sensor can be considered to sense damping by measuring the decay time of the system response to a random disturbance. A sensor program signal is therefore started by sensing an adaptive mode signal exceeding a selected threshold level and stopped when the signal decays below the threshold level.

Because it is also important to sense frequency, the number of half cycles are counted during a program cycle. The deadband threshold detector 29 provides a preferred device for detecting adaptive mode signal half cycles exceeding the selected threshold level and generating pulses representing their presence. However, it is to be understood that other devices such as peak detectors can be employed. Because the remaining portions of the digital adaptive sensor are basically digital in nature, it is desirable to insert a conventional one-shot multivibrator 30 after the threshold detector 29 as a signal repeater so that the pulses generated insure proper gating and counting with the required fan-out.

Figure 5:
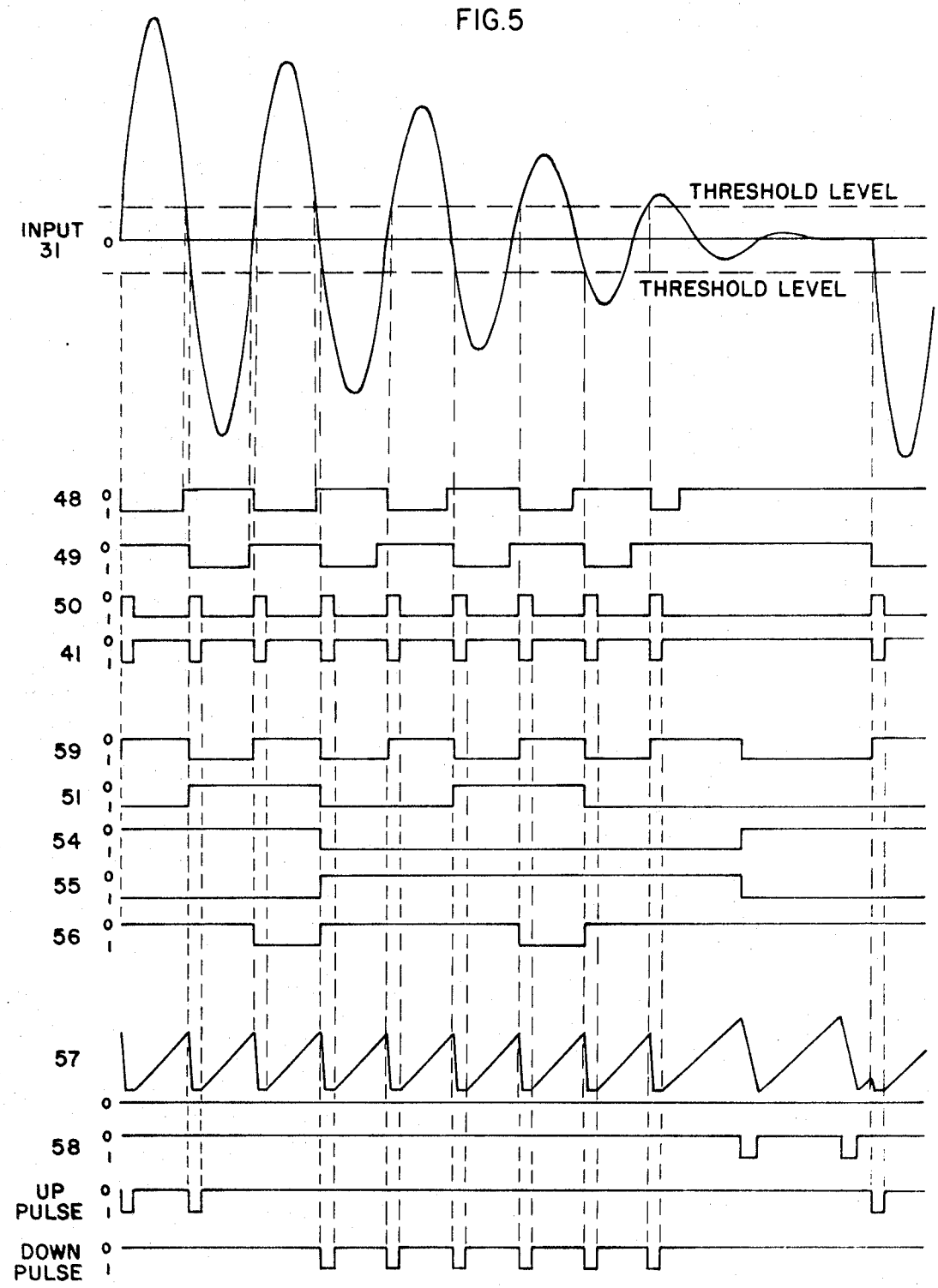
FIG. 5 is a time diagram showing the sequence of pulses and logic changes at various locations in the sensor.

The half cycle pulses are applied to a special three stage binary counter 25, timer 23, and gain changing output circuit 28 in parallel. The particular embodiment of counter 25 shown in FIG. 2 is in the terms of use of standard J-K flip-flops with appropriate interconnections to provide a special sequential counter using negative logic convention, i.e., positive voltage corresponds to the zero or OFF state and ground (or negative) corresponds to the one or ON state. Other flip-flop types such as the R-S type could also be connected to give the same logic counting sequence. The bistable J-K flip-flops 25A, 25B and 25C are cascaded in the usual binary ripple counter fashion except that the last stage, 25C, is connected so that signals on its input 51 can only set 25C to the "one" state but cannot reset it to the "zero" state as is usual for binary stages. Stage 25C can be reset to the zero state only by the counter reset signal 58 when timer 23 reaches the end of its period. The counter reset signal, 58, also resets stages 25A and 25B to zero. When connected in this manner, the three stage counter 25 will cycle through a maximum of eight possible states corresponding to the binary counts of zero through seven. If more than seven threshold crossing signals (connection 50) are received in an interval, counter 25 will not overflow in the conventional binary counter fashion, i.e., going from the seven state to the zero state and then continue to count up toward the seven state again. Instead when counter 25 receives more than seven threshold crossing pulses in an interval, it will count up to the seven state and then jump to the four state and continue to count from there toward the seven state and repeat the subcycle until the threshold crossings cease. Timer 23 will then time out, and its output 58 will reset all of the stages of counter 25 to the zero state. In this manner, counter 25 will be able to count any number of threshold crossings without going back to its zero state. Waveforms corresponding to this sequence are shown in FIG. 5. In examining FIG. 5, it should be kept in mind that these waveforms are for the negative logic convention.

The gain changing output circuit 28 is controlled by the counter 25 in accordance with the logic of NOR gates 28A-C. For both of the first two zero crossings, NOR gate 28A causes NOR gate 28B to generate an UP gain pulse. For the third count, the response of NOR gate 28A reverses and there is no UP gain pulse generated by NOR gate 28B (because of the inverted logic commonly used with present transistor logic circuits). For all counts above three, the flip-flop 25C is switched and its complement output inhibits NOR gate 28B from generating any more up gain pulses. When the fourth count switches flip-flop 25C, NOR gate 28C generates a DOWN gain pulse. Because all greater counts leave flip-flop 25C in the same condition, each succeeding count also causes NOR gate 28C to generate a DOWN gain signal.

In a preferred form of the FIG. 1 control system, a pulse width modulator is used for the variable multiplier 19, and in effect a control signal is switched through with a duty cycle determined by memory 18. With a pair of counters, driven by an oscillator in parallel but out of phase, determining the duty cycle, the UP and DOWN gain pulses from the digital adaptive sensor adjust the phase by adding and subtracting counts to the memory control counter.

As indicated above, the DOWN gain pulses are weighted double the UP gain pulses. This relationship as well as the selection of the point of crossover where additional counts produce DOWN gain are matters of choice in accordance with the needs of a particular application. There are numerous modes of modified implementation. For example, timer 23 can be adjusted to provide a fixed program cycle duration such as the time for seven nominal half cycles, but this is not recommended because (inpart) the sensor will be confused more frequently by disturbances which are close together and noise will tend to generate too many DOWN gain pulses. In the FIG. 2 sensor, UP gain pulses are always generated and when DOWN gain pulses are required, the UP gain pulses are first balanced and then exceeded by DOWN gain pulses. If desired, the signals from the gain changing output circuit can be delayed until the program cycle is stopped and then generated with the resetting of counter 25. However, it is believed that the sensor organization as illustrated provides remarkable ease of implementation requiring only the use of a few flip-flops, a few logic gates, a simple timer, and efficient input circuits.

Figure 2B:
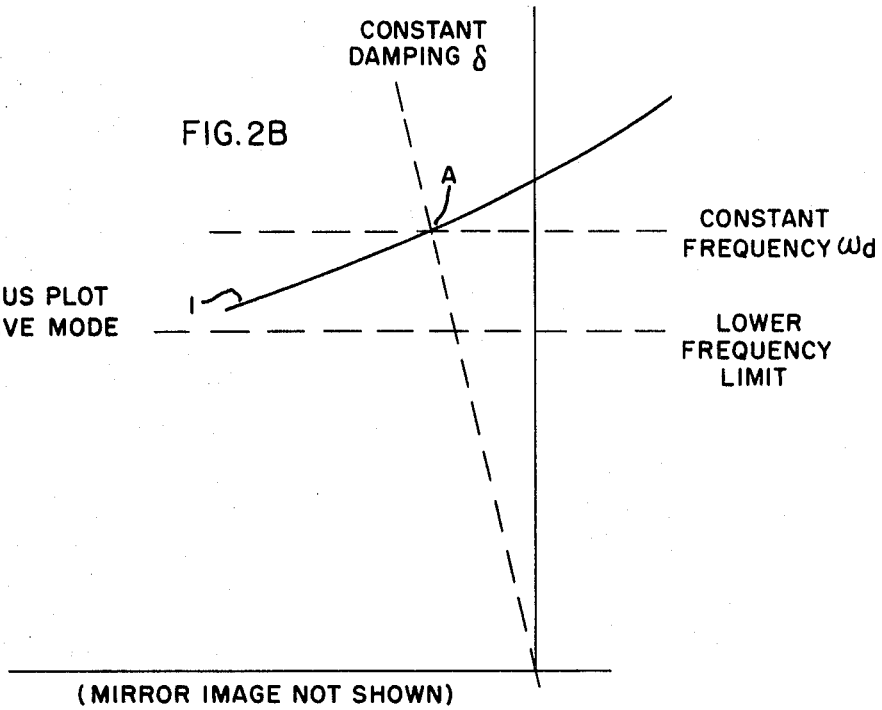

It has been found in practice that this sensor is sensitive to both the damping and frequency characteristics of the control system. In general, these characteristics are found to blend inherently in the operation of the FIG. 2 adaptive sensor. As seen in the FIG. 2B representative root locus plot of the adaptive mode, the dashed lines for constant damping and constant frequency represent the desired characteristics of the control system. As the control system environment, etc. varies between plots during system operation, the adaptive sensor and gain changer 19 respond to servo the system response towards the desired constant frequency and damping characteristics. Reflection and experience reveal that the digital adaptive sensor, primarily because of the input circuit threshold effect, makes the damping characteristic normally dominate over the frequency characteristics for extreme values. Also, the threshold feature tends to produce a desirable integration-like effect on the adaption signal. On the other hand, the operation of timer 23 introduces a lower limit as shown by the lower horizontal dashed line in FIG. 2B. When the adaptive mode response signal frequency falls too low, the half cycle time or time between zero crossings exceeds the fixed period of the timer 23, and the adaptive sensor will increase the gain, regardless of what the damping factor is.

In the intermediate damping regions, $0.2 < \delta < 0.7$, the digital adaptive sensor operates on the statistics of the frequency content of the adaptive mode. In this region the damping ratio of the signal is strongly affected by the noise disturbances and frequency is a better parameter to track. How the sensor operates in the extreme regions is apparent, whereas the operation in the intermediate regions is quite subtle. In the intermediate region the digital adaptive sensor will attempt to hold a gain such that about one in four zero crossings are at a frequency below 2 c.p.s. Statistically speaking then, if, say, 25 percent of the frequency content of the signal being waveform analyzed is less than 2 c.p.s. the digital adaptive sensor will hold a fixed gain. If more than 25 percent of the frequencies are below 2 c.p.s. the digital adaptive sensor will raise the gain. If less than 25 percent of the frequencies are below 2 c.p.s. the digital adaptive sensor will reduce the gain. The operation of the digital adaptive sensor in the intermediate region depends on the statistical content of the input signal. It can be shown that about 25 percent of the spectrum power is less than 2 c.p.s. if the frequency is 3 c.p.s. in the high frequency mode. More important is the fact that if the high frequency mode moves out to 4 c.p.s. the percentage power in the region below 2 c.p.s. is reduced (and the gain will be reduced). Alternatively if the high frequency mode moves in to 2.5 c.p.s., the precentage power in the region below 2 c.p.s. is increased (and the gain will be increased). Gain changing effects both the frequency of the adaptive mode and the amplitude of the power spectrum. The amplitude effects are secondary to the frequency effects and are also convergent to the desired gain setting.

As compared with the Buscher and Walker adaptive sensor, disclosed in the above-cited patent, the digital sensor has been found to provide fully satisfactory damping sensitivity while introducing substantially improved frequency sensitivity.

Figure 3:
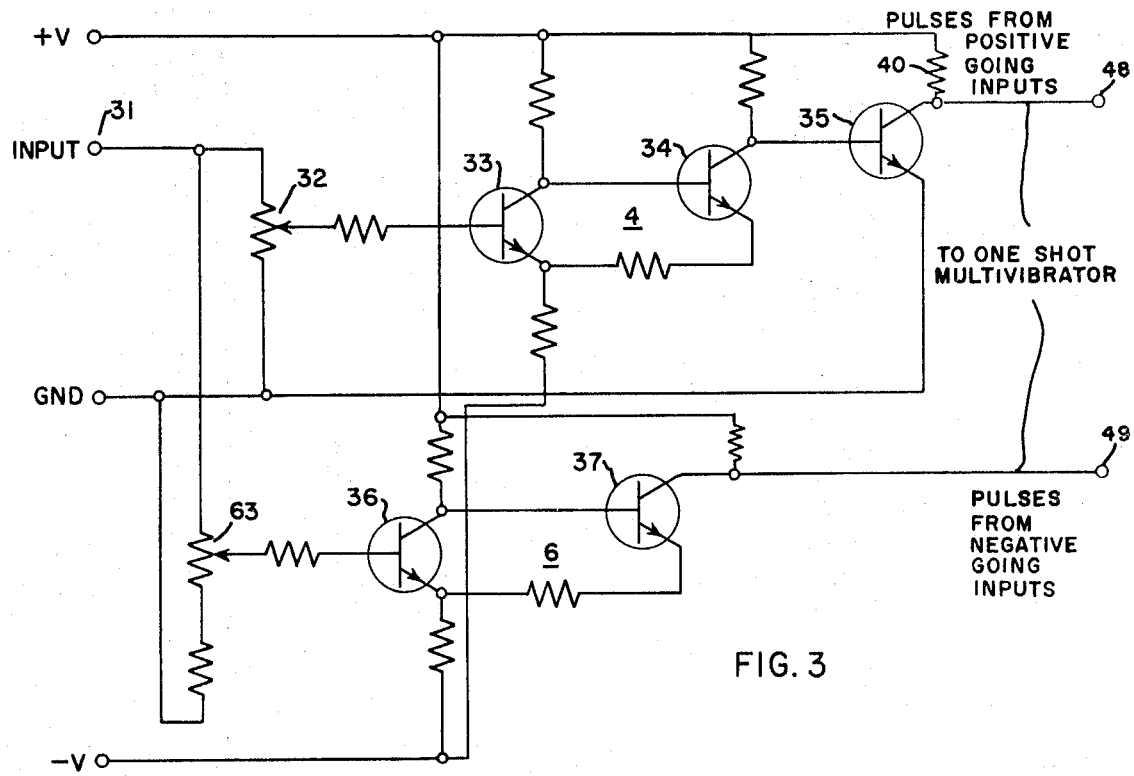
FIGS. 3 and 4 are schematic diagrams of key portions of the input circuits and timer of the FIG. 2 sensor.
Figure 4:
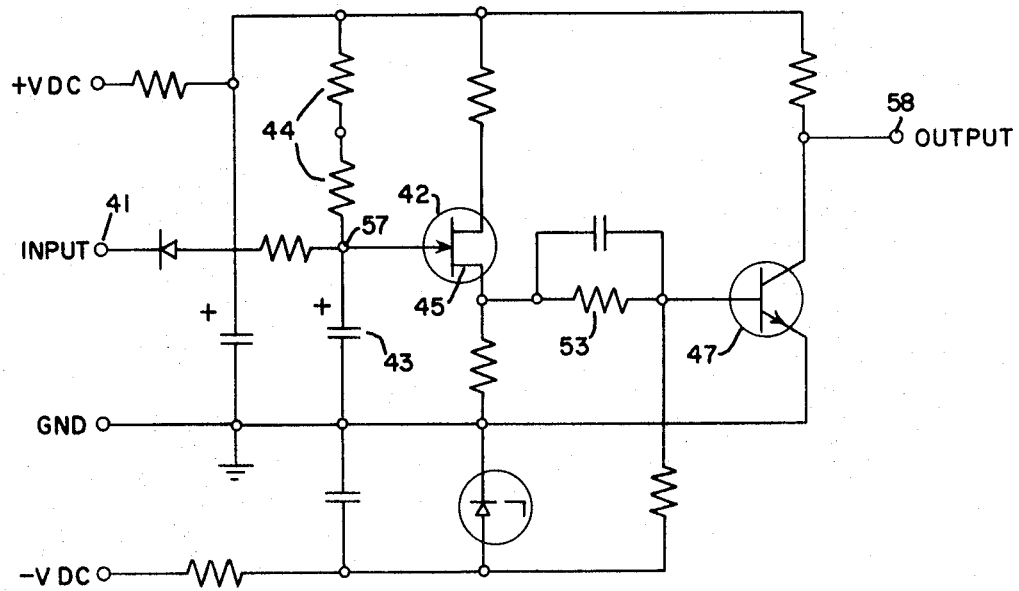

FIGS. 3 and 4 are schematic diagrams of preferred circuits for performing key functions in the adaptive sensor of FIG. 2. FIG. 3 is the deadband threshold detector circuit and peak shown at 29 in the input circuits 21. Input signals applied to terminal 31 are coupled in parallel to the positive threshold detector and negative threshold detector sections 4 and 6 of the threshold circuit and detector 29. The positive threshold detector section 4 comprises of transistors 33, 34 and 35 detects when the input signal applied to terminal 31 becomes greater than the positive threshold level selected by adjusting the input potentiometer 32. Transistors 33 and 34 operate as a Schmitt circuit and transistor 35 operates as an inverter. When the input signal is at zero or negative voltage, transistors 33 and 35 are turned off and the output 48 is a logic O (high voltage) as supplied through resistor 40. Positive-going input signals turns on transistor 33 when the input voltage exceeds the positive threshold level. Transistor 34 responds to the output of transistor 33 regeneratively and is rapidly turned from on to off when transistor 33 turns off to on. Transistor 35 is similarly coupled to transistor 34 but inverts the response. The output 48 is controlled by transistor 35 and changes from a logic O (high voltage) to a logic 1 (low voltage) when the positive threshold is exceeded. The negative threshold detector section 6 comprised of transistor 36 and 37 detects when the input signal applied to terminal 31 exceeds the negative threshold level selected by adjusting the input potentiometer 63. Transistor 36 and 37 operates as a Schmitt circuit. When the input signal is at zero or a positive voltage, transistor 36 is turned on, transistor 37 is turned off and the output 49 is a logic O (high voltage). Negative-going input signals turns off transistor 36 when the input voltage exceeds the negative threshold level. Transistor 37 responds to the output of transistor 36 regeneratively and is rapidly turned from off to on when transistor 36 turns from on to off. The output 49 is controlled by transistor 37 and changes from logic O (high voltage) to a logic 1 (low voltage) when the negative threshold is exceeded. Each output signal 48 or 49 from the threshold and detector circuit 29 activates the one-shot multivibrator 30 as shown in FIG. 2.

FIG. 4 is a schematic diagram of the main portion of timer 23 which is basically a modified conventional unijunction transistor oscillator circuit that provides one-half cycle of oscillation for each input pulse. The output 50 of the one-shot multivibrator is inverted by inverter 59 to produce the input 41 to flip-flop 25A and to the timer. At the start of each timing period, the input 41 is momentarily grounded, reducing the charge on capacitor 43 to a minimal charge. Timing starts after the momentary ground is removed, permitting capacitor 43 to be charged through resistors 44 until the capacitor voltage is sufficient to switch the junction between the emitter 45 and base 59 to a low impedance state. This causes transistor 47 to be turned on to initiate a reset pulse, the output of the circuit. In the event a second input pulse is applied to terminal 41 before a reset pulse is generated, the charge on capacitor 43 is reduced and the timing half cycle restarted.

The operation may be further explained by referring to the time diagram of FIG. 5 which shows the threshold and detector circuit 29 detecting five positive threshold crossings. The timing diagram assumes an impact wave form at point 31 and the positive and negative threshold levels indicated. Below the waveform and time coordinated with the wave form are diagrams of the logic changes and conditions in each part of the block diagram of FIG. 2 numbered.

As the input 31 exceeds the positive threshold level, the threshold output 48 changes from a logic 0 to a logic 1. When the input 31 returns under the threshold level, the threshold output 48 changes from a logic 1 to a logic O. When the input 31 exceeds the negative threshold level, the threshold output 49 changes from a logic 0 to a logic 1. When input 31 returns under the threshold level, the threshold output 49 changes from a logic 1 to a logic 0. The timing diagram shows the deadband threshold detector circuit 29 detecting four negative threshold crossings. The one-shot multivibrator output 50 is normally logic 1 and changes to a logic 0 for a short period every time either outputs 48 or 49 from the deadband threshold detector circuit 29 changes from a logic 0 to a logic 1. The multivibrator pulse output 50 is inverted to a logic 1 pulse into 41 by the inverter 59 prior to its arrival at timer 23.

The counter 25 counts every one-shot multivibrator pulse output 50. The counter counts or changes its state every time the inverter multivibrator output 41 changes from 0 to 1. The outputs of flip-flop 25A (59) and flip-flop 25B (51) are the inputs to NOR gate 28A. The output of NOR gate 28A (56) is a logic 0 when either input 59 or 51 is a logic 1 and a logic 1 when both inputs are logic 0. The NOR gate 28A output prevents the third pulse from the multivibrator 30 from producing up gain pulse.

For all counts above three, the flip-flop 25C is switched to its 1 state. The flip-flop output 54 inhibits NOR gate 28B and output 55 releases NOR gate 28C.

NOR gate 28B output is a logic 0 whenever any one of its three inputs 50, 54 or 56 is a logic 1. When all three inputs are logic 0, the NOR gate 28B logic output is a logic 1 when the counter has not counter to three (56), when the counter has not counted four or more input pulses (54), and a pulse 50 is present from the one-shot multivibrator 30.

NOR gate 28C provides DOWN pulses in the same manner as NOR gate 28B provided UP pulses. NOR gate 28C provides a DOWN pulse output when the counter has counted four or more input pulses 55 and a pulse 50 is present from the one-shot multivibrator 30.

The timer input 41 is momentarily a logic 1 (low voltage) for the duration of the multivibrator output pulse 50. Timing starts after the momentary ground is removed, permitting capacitor 43 to charge through resistor 44. The waveform 57 is applied to the emitter of the unijunction transistors 42. When the time between multivibrator pulses 50 is sufficiently high to switch the junction between the emitter and base 45 to its low impedance state, it will reduce the charge on capacitor 43 and produce a reset pulse 58. The counter 25 is then reset by the reset pulse and ready for the next input signal 31.

While particular embodiments of the invention have been shown and described herein, it is not intended that the invention be limited to such disclosure, but that changes and modifications can be made and incorporated within the scope of the claims.

I claim:

1. In a control system, a digital adaptive sensor comprising:
    a. a filter responsive to feedback signals for isolating the adaptive mode signal portion representing system adaptive performance;
    b. a threshold detector circuit passing the portion of the adaptive mode signals exceeding selected thresholds;
    c. a counter for counting the adaptive mode signal half cycles passing said threshold detector circuit;
    d. a timer, started by a half cycle adaptive signal passing said threshold detector circuit, for resetting said counter in accordance with a selected time setting
    e. a logic circuit responsive to said counter for generating gain changing signals in accordance with a selected logic program.

2. In a self-adaptive flight control system for operating an aircraft control surface so as to provide maneuvering control and stability augmentation in which there is a closed servoloop which provides appropriate response characteristics including a variable signal gain arrangement to make the system self-adaptive to compensate for changes in the condition of the equipment, such as aging, or the environmental changes, such as those caused by speed changes, a digital adaptive sensor for generating signals to adjust the variable gain arrangement comprising:
    a. input circuit means for deriving adaptive mode response signals from the system feedback signals, whereby that portion of the feedback information relating to variant system response is isolated from the remaining information, the input circuit means including filter means, a threshold and half-cycle detector circuit means for generating pulses representing the occurrence of an adaptive mode signal exceeding an established threshold level;
    b. counting and logic means, responsive to the number of half-cycle pulses generated by said input circuit means during a time period, for generating an adaptive gain changing signal representative of input signal variations from said threshold levels;
    c. timer means responsive to an initial pulse for setting said time period and for resetting said counting and logic means.

3. In a control system having variable gain for making the system self-adaptive, a digital adaptive sensor for generating a gain changing signal comprising:
    a. input circuit means, responsive to system feedback signals for deriving signals representative of the system damping and frequency response characteristics, including a threshold detector circuit for passing only adaptive mode signals exceeding a threshold level whereby transient response signals are analyzed and for generating pulse signals representing the occurrence of a half-cycle adaptive mode signal exceeding the threshold level;
    b. counter means for counting said pulse signals during each program cycle;
    c. timer means responsive to said input circuit means for terminating the program cycle by resetting said counter means;
    d. logic means, responsive to the count accumulated during each program cycle, for generating gain changing signals in accordance therewith.

4. In a flight control system, having means responsive to applied command signals and feedback signals for generating a control signal and an adjustable gain changer, effectively in series with the output of said means for generating a control signal, for varying the loop gain so as to make the system self-adaptive, a damping and frequency sensor comprising:
    a. filter means, responsive to attitude feedback signals passed through a canceller, for deriving signals representing the system adaptive mode response to transient disturbances;
    b. a threshold detector circuit for passing only those portions of the adaptive mode signals exceeding a selected threshold level and for generating a pulse representing the occurrence of said adaptive mode signals crossing said threshold level;
    c. a timer, responsive to said pulses for generating a reset signal at a fixed time interval after any said pulse in the absence of another said pulse within a period of time;
    d. a counter, responsive to said pulses for counting pulses occurring before said reset signal and to said timer to be reset by said reset signal;

e. a gain changing signal generator, responsive to the counts of said pulses for adjusting the gain changer to provide self-adaptive system operation.

5. In a control system, a digital adaptive sensor for producing gain changing signals comprising:
   a. a filter responsive to feedback signals for isolating the adaptive mode signal portion representing system performance;
   b. a threshold detector circuit passing the portions of the adaptive mode signals exceeding a threshold amplitude and for generating pulses representing the occurrence of half-cycle adaptive mode signals exceeding the selected threshold;
   c. a set of flip-flops arranged for counting the pulses representing the adaptive mode signal half-cycles from said threshold detector circuit;
   d. a timer for resetting said flip-flops in accordance with a selected time setting if not restarted within the selected time;
   e. a logic circuit including NOR gates responsive to said flip-flops for generating gain changing signals in accordance with a selected logic program and the accumulated count.

6. In a servomechanism control system for operating a control element, an adaptive sensor for creating gain changing signals comprising:
   a. signal processing means, responsive to input motion command signals and to feedback signals, for generating a control signal to be applied to the control element in accordance with the nominal system characteristics;
   b. a gain changer, interposed between the source of input command signals and the control element, for adapting the system response characteristics to changes from the nominal vehicle characteristics;
   c. circuit means for deriving adaptive mode response signals from the system feedback signals, whereby that portion of the feedback information relating to variant system response is isolated from the remaining information, the circuit means including filter means, a threshold and half-cycle detector circuit means for generating pulses representing the occurrence of an adaptive mode signal exceeding the threshold level;
   d. counting and logic means, responsive to the number of half-cycles pulses generated by said circuit means during a program cycle, for generating adaptive gain changing signals in accordance with the count of half cycles;
   e. timer means responsive to said counting and logic means and to time for starting and resetting said counting and logic means.

7. In a servomechanism control system wherein a control element is operated with variable gain, an adaptive sensor for generating gain changing signals;
   a. signal processing means, responsive to input motion command signals and to feedback signals, for generating a control signal to be applied to the control element in accordance with the nominal system characteristics;
   b. a gain changer, interposed between the source of input command signals and the control element, for adapting the system response characteristics to changes from the nominal vehicle characteristics;
   c. input means, responsive to system feedback signals for deriving signals representative of the system damping and frequency response characteristics, including threshold circuit means for passing only adaptive mode signals exceeding a threshold level whereby transient response signals are analyzed;
   d. detecting circuit means, also included in said input means with said threshold circuit means, for generating pulse signals representing the occurrence of a half cycle adaptive mode signal crossing the threshold level;
   e. counter means for counting the said pulse signals during each program cycle;
   timer means for terminating the program cycle by resetting said counter means;
   g. logic means, responsive to the count accumulated by said counter means during each program cycle, for generating gain changing signals in accordance with said count.